United States Patent
Pal et al.

(10) Patent No.: US 8,884,480 B2
(45) Date of Patent: Nov. 11, 2014

(54) MOTOR WITH COOLED ROTOR

(75) Inventors: Debabrata Pal, Hoffman Estates, IL (US); Craig R. LeGros, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 361 days.

(21) Appl. No.: 13/190,824

(22) Filed: Jul. 26, 2011

(65) Prior Publication Data

US 2013/0025828 A1 Jan. 31, 2013

(51) Int. Cl.
*H02K 1/32* (2006.01)
*F04D 29/32* (2006.01)
*F04D 25/08* (2006.01)
*F04D 29/58* (2006.01)

(52) U.S. Cl.
CPC .............. *F04D 25/08* (2013.01); *F04D 29/329* (2013.01); *F04D 29/5853* (2013.01)
USPC .......... 310/61; 417/423.8; 417/369; 417/371; 310/52

(58) Field of Classification Search
USPC ......... 310/52, 54, 61; 165/124.06; 417/423.8, 417/366, 369, 371
See application file for complete search history.

(56) References Cited

U.S. PATENT DOCUMENTS

| | | | |
|---|---|---|---|
| 3,568,762 A * | 3/1971 | Harbaugh | 165/104.26 |
| 4,012,770 A * | 3/1977 | Pravda et al. | 257/715 |
| 8,368,265 B2 * | 2/2013 | Owng et al. | 310/54 |
| 2010/0277028 A1 * | 11/2010 | Alexander et al. | 310/156.51 |

* cited by examiner

*Primary Examiner* — Devon Kramer
*Assistant Examiner* — Patrick Hamo
(74) *Attorney, Agent, or Firm* — Cantor Colburn LLP

(57) ABSTRACT

A fan includes an air movement implement including a blade and a motor that drives the air movement implement. The motor includes a rotor that includes an internal diameter heat exchanger and a heat pipe having a first end and a second end, the first end in thermal contact with the internal diameter heat exchanger and the second end in thermal contact with the blade.

1 Claim, 4 Drawing Sheets

MOTOR WITH COOLED ROTOR

BACKGROUND OF THE INVENTION

The present invention is related to motors and, in particular, to reducing the temperature variations experienced by a rotor of a motor.

In many different applications, a motor or other machine that includes a rotor that can be placed in systems where it experiences a wide range of temperatures. For example, an induction motor can be used to drive an impeller that draws air through a heat exchanger in an aircraft. The combination of the motor and the impeller is sometimes referred to as a ram air fan. While the aircraft is on the ground, outside air is drawn by the ram air fan through the heat exchanger. The air is used to carry heat away from the heat exchanger. Internal portions of the ram air fan are cooled by cooling air that is diverted around the heat exchanger. When the aircraft is in flight, the cooling air is significantly colder than when it is on the ground. As such, the internal portions of the motor (e.g., the rotor) can experience wide-ranging temperature cycles that can result in shortened lifecycles for the rotor.

BRIEF DESCRIPTION OF THE INVENTION

According to one embodiment, a fan that includes an air movement implement including a blade and a motor that drives the air movement implement is disclosed. The motor in this embodiment includes a rotor that includes an internal diameter heat exchanger and a heat pipe having a first end and a second end, the first end in thermal contact with the internal diameter heat exchanger and the second end in thermal contact with the blade.

According to another embodiment, a system that includes an air intake, a heat exchanger coupled to the air intake, an air output coupled to the air heat exchanger, and a fan disposed within the air output that causes air to be drawn in the air intake, through the heat exchanger and expelled through the air output is disclosed. The fan includes an air movement implement including a blade and a motor that drives the air movement implement. The motor includes a rotor that includes an internal diameter heat exchanger and a heat pipe having a first end and a second end, the first end in thermal contact with the internal diameter heat exchanger and the second end in thermal contact with the blade.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
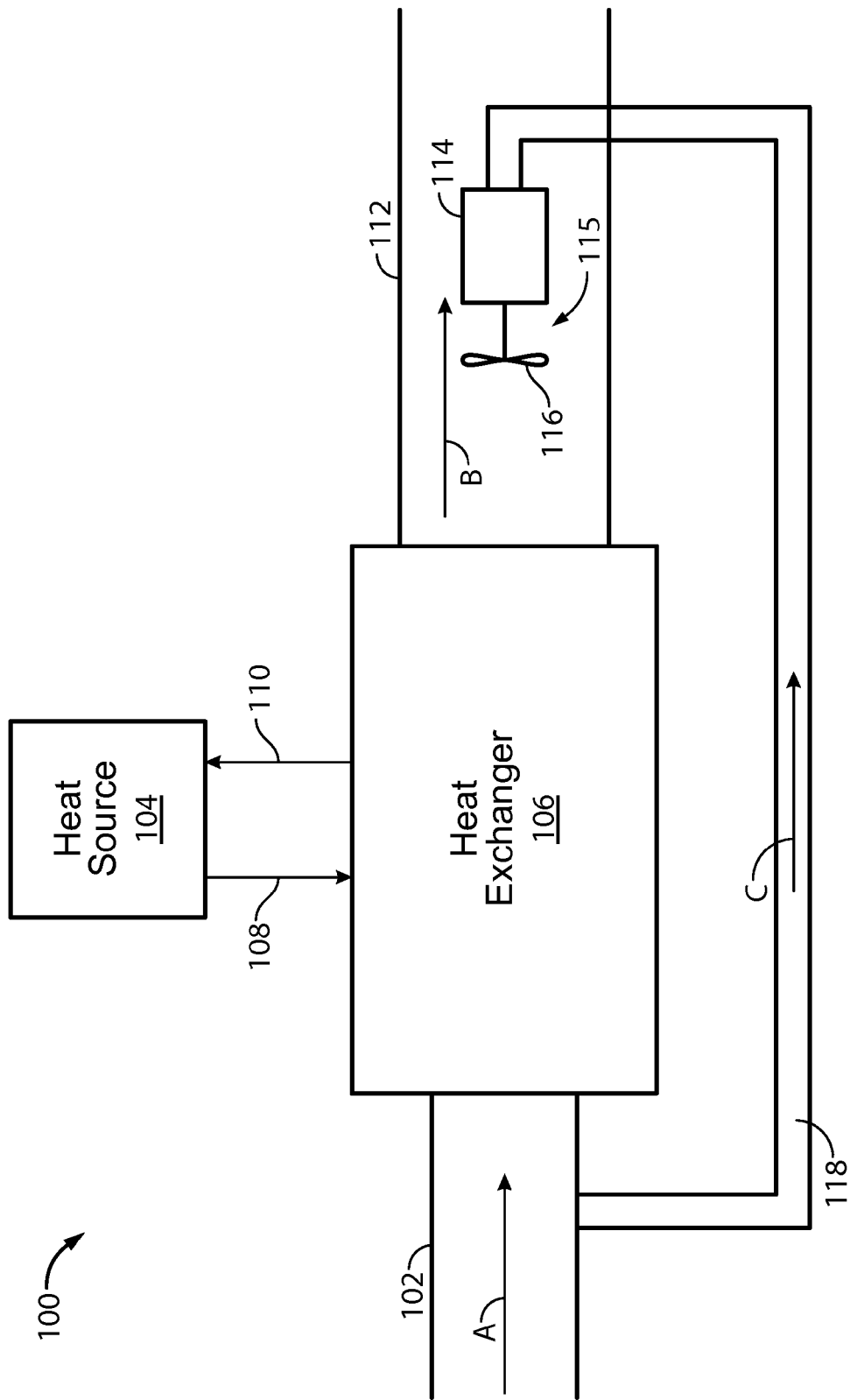
FIG. 1 is a block diagram illustrating a system in which embodiments of the present invention can be implemented.

FIG. 1 illustrates a system 100 in which embodiments of the present invention may be implemented. The system 100 can be part of an aircraft or any other type of device that can cause the system 100 to be moved in a forward direction. Embodiments of the present invention are directed to a motor 114 that can be used in the system 100. According to one embodiment, the motor 114 can includes a heat pipe that is used to cool or heat the rotor thereof. In one embodiment, the heat pipe causes the range of a rotor temperature cycle to be reduced as compared to motors that do not include a heat pipe.

In FIG. 1, the motor 114 is part of a fan 115 that includes an air movement implement such as a fan blade or impeller generally shown by element 116. The motor 114 can be an induction motor in one embodiment but it shall be understood that the motor 114 could be any type of electric motor including, for example, a synchronous motor, a DC motor or a slip-ring AC motor to name but a few. In FIG. 1, the fan 115 is arranged downstream of a heat exchanger 106. The terms upstream and downstream refer to the direction of travel of a substance (e.g., air) through a system. In particular, a position is upstream of another position if it is closer to the entry to the system than the other position. For example, in FIG. 1, assuming that air travels in the direction shown by arrows A, the heat exchanger 106 is upstream of the fan 115. Further, and in the same vein, the fan 115 is downstream of heat exchanger 106.

In operation, a heat source 104 is provided from which heat is drawn. A cooling fluid circulates through the heat source 104 and is heated therein. The heated fluid is provided through output connection 108 to the heat exchanger 106. The fluid is cooled as it passes through the heat exchanger 106 and is returned through input connection 110 to the heat source 104 where it can again be used to remove heat from it. In one embodiment, the heat source 104 includes some or all of the electronics that operate in an aircraft. It shall be understood, however, that the heat source 104 can be any device or system that generates heat and the heat can be carried from it by means other than a fluid.

In FIG. 1, the fan 115 causes input air (illustrated by arrow A) to be drawn into an input portion 102, through the heat exchanger 106, and through an output portion 112 where it is expelled back into the atmosphere as output air (illustrated by arrow B). A cooling duct 118 is coupled to the input portion 102 such that at least a portion of air drawn into the input portion 102 is diverted to the motor 114 before the air is heated in the heat exchanger 106. Such air shall be referred to herein as "cooling air" and is illustrated by arrow C.

In operation, while the system 100 is at rest (e.g., an aircraft is on the ground) the fan 115 is required to draw in input air A. In such a case, the input air A is at a temperature generally in the 0 to 120 degrees F. (−17 to 40 degrees C.) range while the output air B is about 200 degrees F. (93.3 degrees C.). In such a case, the rotor of motor 114 is at a temperature of about 190 degrees F. (87.7 degrees C.). When the system 100 is motion (e.g., the aircraft is cruising), the motion of the system 100 is all that is need to cause input air A to pass through the heat exchanger 106. In such a case, the motor 114 can be turned off. The motor 114, however, is still cooled with cooling air C. In such instances, the cooling air C is in the range of about the −15 degrees F. (−26.1 degrees C.). The motor housing is heated by the output air B (at about 200 degrees F. (93.3 degrees C.)). The heating of the motor housing can heat the rotor to about −10 degrees F. (−23.3 degrees C.). Given the above example, it can readily realized the rotor of motor 114 can experience a 200 degree (93.3 degrees C.) or more temperature variation each time the system starts and stops moving.

Figure 2:
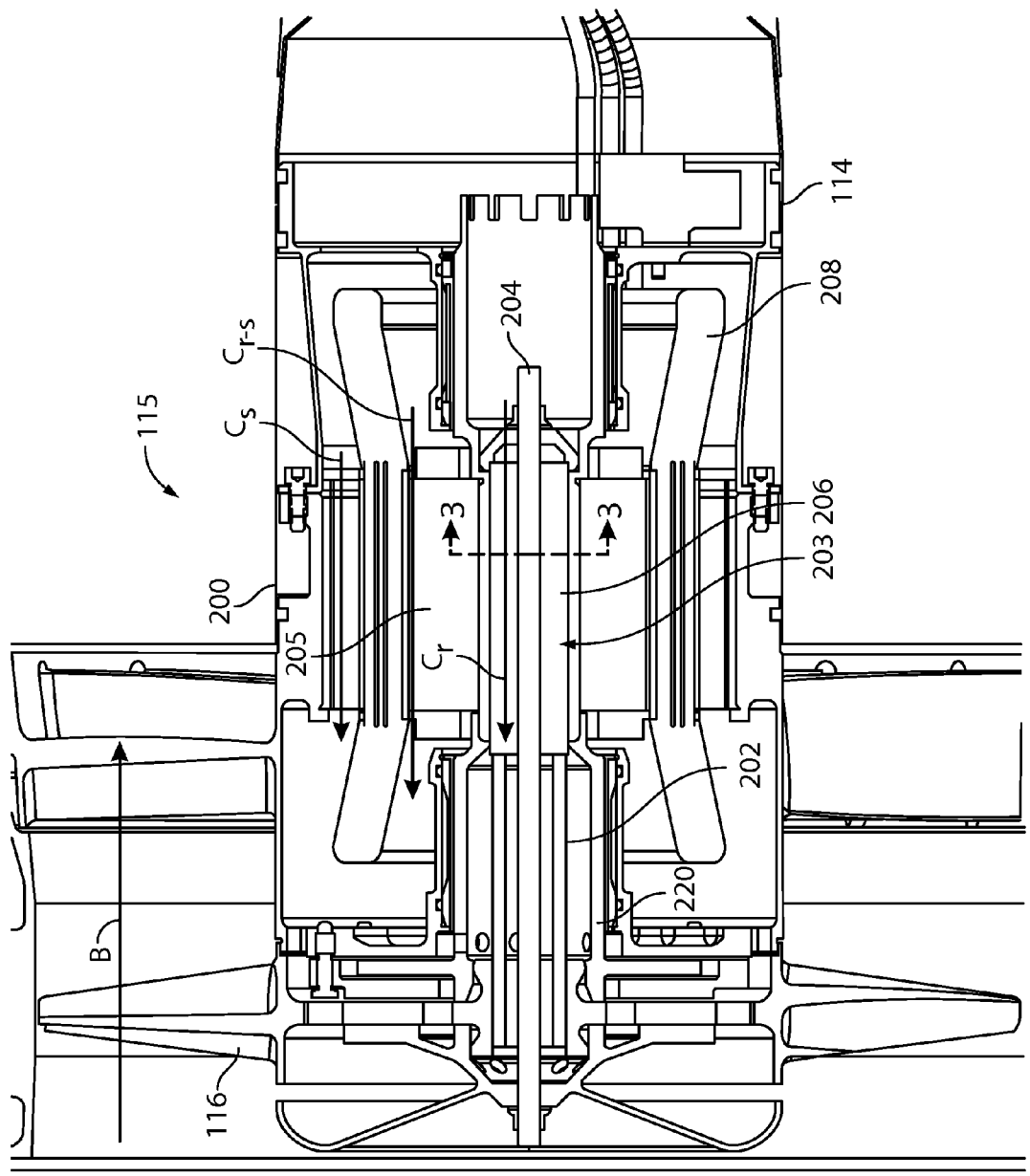
FIG. 2 is cut-away view of a fan according to one embodiment of the present invention.

FIG. 2 shows a cut-away side view of fan 115 according to one embodiment. The fan 115 includes air movement implement 116 (e.g., fan or impeller blade) that is coupled to and driven by motor 114. The motor 114 includes an outer shell 200 that surrounds a rotor 203 and a stator 208. The rotor 203 includes, in this embodiment, a tie rod 204 coupled to and surrounded by an inner diameter heat exchanger 206. In the case where the motor 114 is an induction motor, the rotor 203 can include one or windings 205 disposed between the inner diameter heat exchanger 206 and the stator 208. As is known in the art, the rotor 203 is coupled to and provides a driving force to air movement implement 116 by a shaft 220. According to one embodiment, a heat pipe 202 is coupled to the air movement implement 116 and the inner diameter heat exchanger 206. As illustrated, the heat pipe 202 is within the shaft 220 but the relative locations could be varied based on how the shaft 220 is coupled to the rotor 203.

Figure 3:
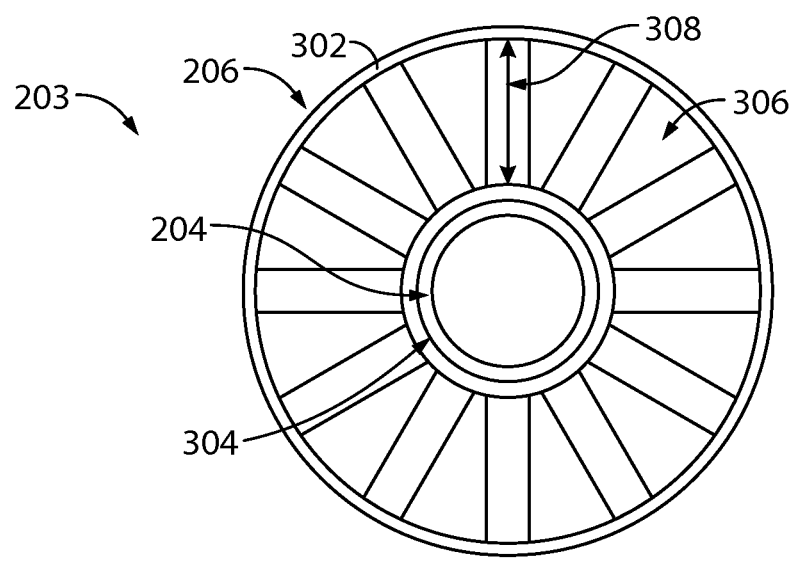
FIG. 3 is a cross-section of an inner diameter heat exchanger.

FIG. 3 is a cross-section of the rotor 203 taken along lines A-A. The rotor 203 includes the tie rod 204 surrounded by the inner diameter heat exchanger 206. In this embodiment, the inner diameter heat exchanger 206 includes an outer shell 302 that defines an outer perimeter thereof and an inner layer 304. One or more fins 306 extend radially between the inner layer 304 and the outer shell 302. The fins 306 define one or more air channels 308 through which cooling air can pass.

Referring again to FIG. 2, the cooling air C received via cooling duct 118 (FIG. 1) can travel through several different paths. For instance, a portion of the cooling air C illustrated as $C_r$ can pass through the inner diameter heat exchanger 206. This air serves to generally cool the rotor 203. The rotor 203 can also be cooled by a portion of the cooling air C illustrated as $C_{r-s}$ that passes between the rotor 203 and the stator 208 as well as portion $C_s$ that passes between the stator 208 and the outer shell 200.

The temperature of the rotor 203 will first be explained assuming that the heat pipe 202 is omitted and then explained with the heat pipe 202 included. In the following explanation it shall be assumed that the fan 115 is arranged in a system as illustrated in FIG. 1 and that the system is part of an aircraft. It shall be understood the fan 115 need not be disposed in any particular system.

While on the ground, the cooling air C can have a maximum temperature of about 130 degrees F. (54.4 degrees C.) and the output air B has a maximum temperature of about 210 degrees F. (98.8 degrees C.). In such a case, the rotor 203 can have a temperature that is about 190 degrees F. (87.7 degrees C.). When the aircraft is in flight, the motor 114 can be turned off. The motor 114, however, still receives cooling air C and the cooling air C is now much colder (in the range of about −10 degrees F. (−23.3 degrees C.)) than when the aircraft was on the ground. In flight, the output air B can warm the outer shell 200 and, to some extent, the stator 208. The rotor 203, however, becomes much colder due to the cooling air C as described above.

Figure 4:
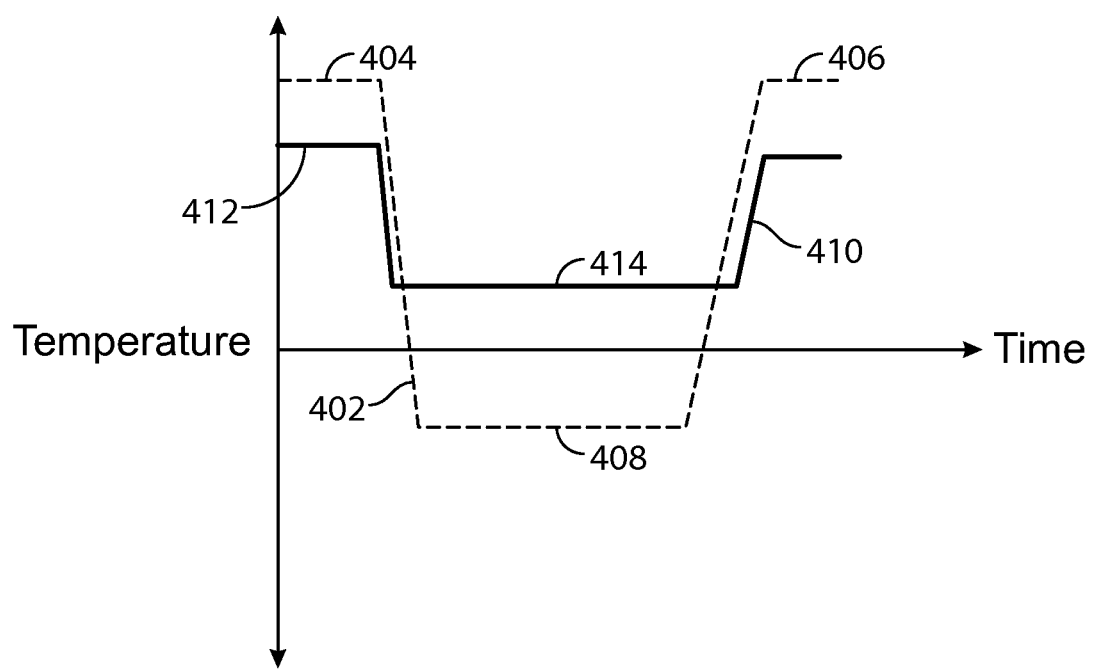
FIG. 4 is a graph showing simulated temperature variations for a rotor according to the prior art and one embodiment of the present invention.

FIG. 4 graphically shows simulations of the temperature of the rotor 203 as the aircraft is one the ground, in flight, and lands again. Trace 402 represents this cycle for the configuration that does not include a heat pipe according to the present invention. Peaks 404 and 406 represent the rotor temperature when the aircraft is on the ground and valley 408 represents the rotor temperature when the aircraft is in-flight. As described above, the rotor temperature 402 can vary by around 200 degrees F. (93.3 degrees C.) in such a case.

In contrast, trace 410 illustrates the rotor temperature for the same cycle when the heat pipe 202 is added. In general, the heat pipe 202 lowers the ground rotor temperature (peak 412) because it allows some of the heat to be dissipated through the air movement implement 116. Likewise, the heat pipe 202 can allow heat from the air movement device to be transferred to the rotor 203 when the aircraft is in flight and, thereby, raise the in-flight rotor temperature (valley 414). In one embodiment, only the valley 414 is raised and peak 412 is at about the same level as the peaks 404, 406.

Referring again to FIG. 2, the heat pipe 202 is illustrated as being solid. It shall be understood that in another embodiment, the heat pipe can include an inner cavity formed therein. In either case, the heat pipe 202 can be arranged such that it contacts an end of the inner diameter heat exchanger 206 and provides a thermal pathway between it and the air movement implement 116.

Figure 5:
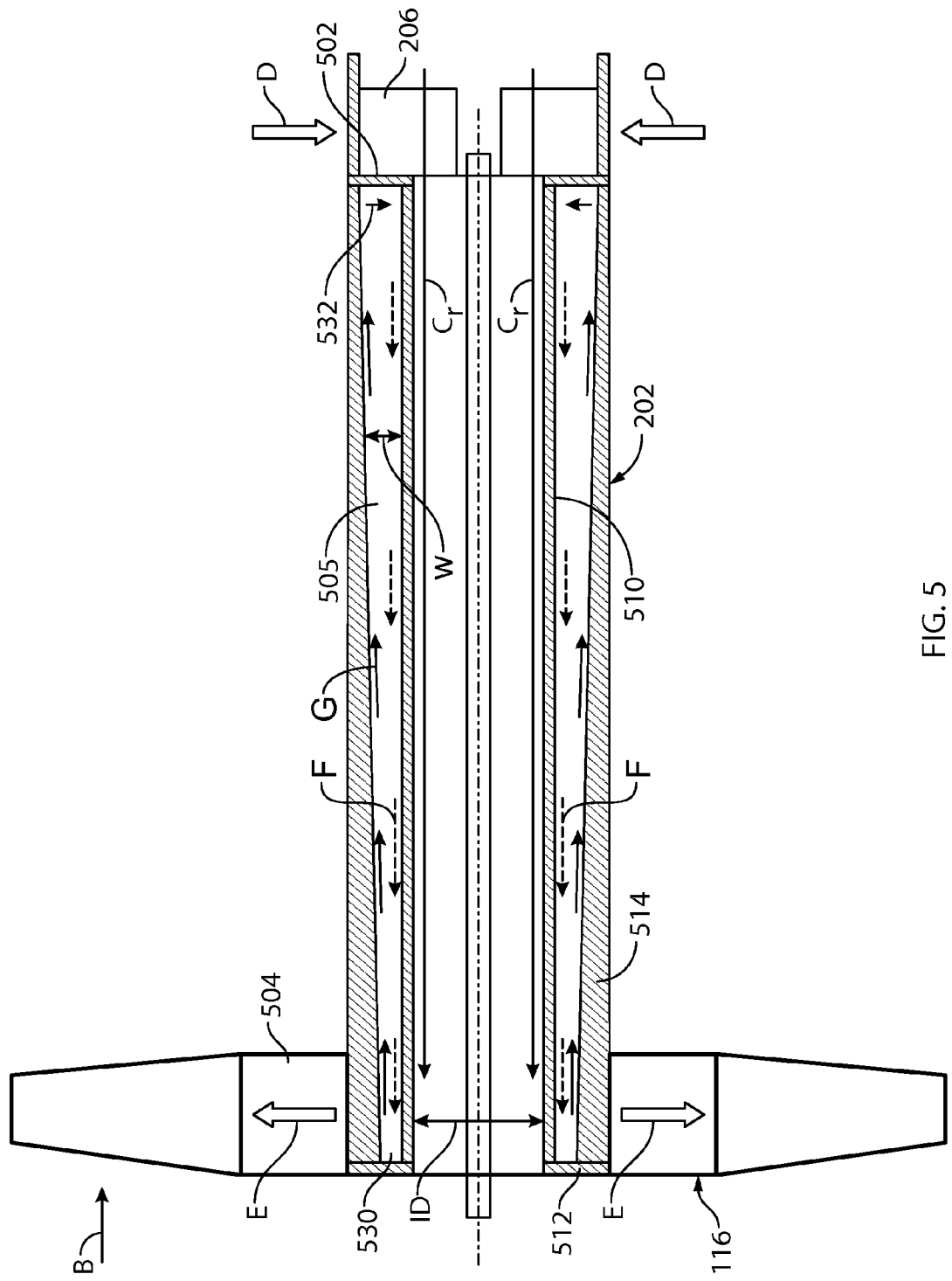
FIG. 5 is a cut-away side view of a heat pipe according to one embodiment of the present invention coupled between an inner diameter heat exchanger and an air movement implement.

FIG. 5 shows a detail in cross-section of the heat pipe 202. The heat pipe 202 is in thermal contact with an end 502 of the inner diameter heat exchanger 206 and the air movement implement 116. In FIG. 5, while on the ground, heat is received from the rotor windings (not shown) as indicated by arrows D. This heat is dissipated by the passage of rotor cooling air $C_r$. The heat pipe 202 further dissipates the heat. In particular, the heat pipe 202 can provide a thermal pathway to the air movement implement 116 such that heat (shown by arrows E) can travel out blades 504 of the air movement implement 116.

The heat pipe 202 can be formed of two or more different portions. As illustrated, the heat pipe 202 includes an inner shell 510, ends 512 and outer shell 514. In one embodiment, the ends 512 and outer shell 514 are formed from a single piece. In one embodiment, the inner shell 510 is formed of a material with a lower thermal conductivity than one or both of the outer shell 514 and the ends 512. The inner shell 510 can be formed of copper, aluminum, ULTEM or any other suitable plastic material and one or both of outer shell 514 and the ends 512 can be formed of copper or aluminum.

In one embodiment, the heat pipe 202 includes a cavity 505 formed between the inner and outer shells 510, 514. The cavity 504 can have a width w that decreases as the distance from the internal diameter heat exchanger 206 increases. In one embodiment, the inner shell 510 is substantially cylindrical and has a constant thickness while the outer shell 514 has thickness that varies such that the width w varies as described above.

In one embodiment, the cavity 505 can be filled with a fluid. In one embodiment, the fluid is one of methanol or ammonia. It shall be understood that the fluid should remain in the liquid state at the coldest expected temperature to which it will be exposed. In one embodiment, the inner shell 510, the ends 512 and the outer shell 514 are crimped together. In another, they are ultrasonically welded together.

For ease of explanation, the cavity 505 shall be described as having narrow end 530 and wide end 532. The width w is largest at the wide end 532 and smallest at the narrow end 530. In one embodiment, the narrow end 530 is located at or near the air movement implement 116 and the wide end 532 abuts the inner diameter heat exchanger 206. The inner diameter ID of the heat pipe 202 is less than the outer diameter OD of the inner diameter heat exchanger 206 in one embodiment.

In one embodiment, the fluid can aid in dissipating heat from the rotor while the system in which the motor is placed is stationary (i.e., the aircraft is on the ground). In particular, heat from the inner diameter heat exchanger 206 can cause the fluid to convert to a vapor or gas. Due to the latent heat of fusion, this change of state can dissipate heat in and of itself.

The vapor/gas expands and travels towards the narrow end 530 as indicated by arrows. As the vapor/gas reaches the narrow end 530, its heat can be transferred to the air movement implement 116 and bled off by output air B through blades 504. As the vapor/gas loses its heat, it returns to the liquid phase. The rotation of the air movement implement 116 and, thus, the heat pipe 202, causes the fluid to track the outer shell 514 and travel back towards the wide end 532 as indicated by arrows G where the process can be repeated.

When the system 100 in which the motor 114 is in motion, the rotor cooling air $C_r$ can be much colder than when the system 100 was stationary as described above. In such a case, the heat pipe 202 itself and the fluid can provide a path for heat from the output air B to travel from the blades 504 back into the inner diameter heat exchanger 206 and, consequently, reduce the cooling effect to the rotor cooling air $C_r$.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system comprising:
   an air intake;
   a first heat exchanger coupled to the air intake;
   an air output coupled to the first heat exchanger; and
   a fan disposed within the air output that causes air to be drawn in the air intake, through the heat exchanger and expelled through the air output, the fan including:
   an air movement implement including a blade; and
   a motor that drives the air movement implement and includes:
   a rotor that includes an internal diameter heat exchanger;
   a heat pipe having a first end and a second end, the first end extending from and in thermal contact with the internal diameter heat exchanger and the second end in thermal contact with the blade, the heat pipe having an inner diameter that defines an internal passageway fluidly coupled to receive air from the internal diameter heat exchanger;
   a cooling duct coupled between the air intake and the motor that provides air that has not passed through the first heat exchanger to the motor, wherein the passageway is fluidly coupled to the cooling duct.

* * * * *